US009844881B2

(12) United States Patent
Payton et al.

(10) Patent No.: US 9,844,881 B2
(45) Date of Patent: Dec. 19, 2017

(54) ROBOTIC DEVICE INCLUDING MACHINE VISION

(71) Applicant: GM GLOBAL TECHNOLOGY OPERATIONS LLC, Detroit, MI (US)

(72) Inventors: David W. Payton, Calabasas, CA (US); Kyungnam Kim, Newbury Park, CA (US); Zhichao Chen, Woodland Hills, CA (US); Ryan M. Uhlenbrock, Los Angeles, CA (US); Li Yang Ku, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 14/746,072

(22) Filed: Jun. 22, 2015

(65) Prior Publication Data

US 2016/0368148 A1    Dec. 22, 2016

(51) Int. Cl.
*B25J 9/16* (2006.01)

(52) U.S. Cl.
CPC .................................. *B25J 9/1697* (2013.01)

(58) Field of Classification Search
CPC ......... B25J 9/1697; B25J 9/1602; B25J 9/163
See application file for complete search history.

(56) References Cited

U.S. PATENT DOCUMENTS

| | | | | |
|---|---|---|---|---|
| 5,040,159 A * | 8/1991 | Oliver | .................... | G05B 19/25 369/233 |
| 7,813,528 B2 * | 10/2010 | Porikli | ............... | G06K 9/00771 348/155 |
| 8,159,536 B2 * | 4/2012 | Wang | ................. | G06K 9/00771 348/144 |
| 9,486,921 B1 * | 11/2016 | Straszheim | ............ | B25J 9/1679 |
| 2006/0149489 A1 * | 7/2006 | Joublin | .................... | B25J 9/163 702/92 |
| 2009/0238460 A1 | 9/2009 | Funayama et al. | | |

(Continued)

OTHER PUBLICATIONS

Dekun Yang and John Illingworth, "Calibrating a Robot Camera", BMVC 1994, University of Surrey, Guildford, 10 pps.

(Continued)

*Primary Examiner* — Nicholas Kiswanto
(74) *Attorney, Agent, or Firm* — Quinn IP Law

(57) ABSTRACT

A machine vision system for a controllable robotic device proximal to a workspace includes an image acquisition sensor arranged to periodically capture vision signal inputs each including an image of a field of view including the workspace. A controller operatively couples to the robotic device and includes a non-transitory memory component including an executable vision perception routine. The vision perception routine includes a focus loop control routine operative to dynamically track a focus object in the workspace and a background loop control routine operative to monitor a background of the workspace. The focus loop control routine executes simultaneously asynchronously in parallel with the background loop control routine to determine a combined resultant including the focus object and the background based upon the periodically captured vision signal inputs. The controller is operative to control the robotic device to manipulate the focus object based upon the focus loop control routine.

17 Claims, 2 Drawing Sheets

(56) References Cited

U.S. PATENT DOCUMENTS

| | | | |
|---|---|---|---|
| 2011/0050878 A1* | 3/2011 | Wells | H04N 7/181 |
| | | | 348/86 |
| 2013/0243331 A1 | 9/2013 | Noda et al. | |
| 2014/0161345 A1 | 6/2014 | Djugash | |
| 2014/0163731 A1 | 6/2014 | Shi et al. | |
| 2014/0355861 A1* | 12/2014 | Nirenberg | H04N 19/85 |
| | | | 382/133 |

OTHER PUBLICATIONS

Emmanuel Perez Bonnal, "3D Mapping of Indoor Environments Using RGB-D Kinect Camera for Robotic Mobile Application", Politecnico Di Torino, Department of Control and Computer Engineering, Jul. 2011, 69 pps.

Maxime Latulippe, Alexandre Drouin, Philippe Giguere, and Francois Laviolette, "Accelerated Robust Point Cloud Registration in Natural Environments Through Positive and Unlabeled Learning", Proceedings of the Twenty-Third International Joint Conference on Artificial Intelligence, Laval University, Quebec, Canada, 8 pps.

Radu Bogdan Rusu, Gary Bradski, Romain Thibaux, John Hsu, "Fast 3D Recognition and Pose Using the Viewpoint Feature Histogram", Willow Garage, Menlo Park, CA, USA, 8 pps.

Radu Bogdan Rusu, "Semantic 3D Object Maps for Everyday Manipulation in Human Living Environments", Institut fur Informatic der Technischen Universitat Munchen, Dissertation, 284 pps.

* cited by examiner

ROBOTIC DEVICE INCLUDING MACHINE VISION

TECHNICAL FIELD

The present disclosure relates to robotic devices including flexible end effectors and machine vision systems related therewith.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The ability to recognize and track objects that could be moved by human or other robotic devices with six degrees of freedom is essential if robots are to become useful in a more flexible manufacturing environment. Known industrial robotic devices have vision systems that locate objects using a set of static images or track objects in 2D instead of 3D. In addition, these vision systems usually rely on fixed processing steps that don't change based on the environment. These kinds of vision system designs are not suitable for distributing resources for heavy computation tasks such as real time tracking in 3D and cannot be easily extended when a new vision algorithm is available.

Known robotic vision systems include vision systems that recognize an object pose within a static image and are suitable for industrial robots in a static environment. Known active vision systems exploring a scene have been proposed, and focus on recognizing and reasoning a single static scene. Vision systems for tracking an object pose have been proposed and include two algorithms that execute in different threads to achieve real time tracking. However, such systems have been shown to be unable to recognize objects other than the object presently being tracked.

Known vision systems are mostly single threaded systems that execute a sequence of algorithms. Such vision systems may use multiple threads to speed up the process, but fail to execute multiple algorithms in parallel. For a system that has more than one possible algorithm executing, distributing computing resources based on priority and selecting which algorithm to execute is crucial. Known vision systems simply act as a sensor and have one-way communication with the robot, thus seeking vision accuracy without feedback from the robot.

SUMMARY

A machine vision system for a controllable robotic device proximal to a workspace is described and includes an image acquisition sensor in communication with a controller. The image acquisition sensor is arranged to periodically capture vision signal inputs each including an image of a field of view including the workspace. The controller operatively couples to the robotic device and includes a non-transitory memory component including an executable vision perception routine. The vision perception routine includes a focus loop control routine operative to dynamically track a focus object in the workspace and a background loop control routine operative to monitor a background of the workspace. The focus loop control routine executes simultaneously asynchronously in parallel with the background loop control routine to determine a combined resultant including the focus object and the background based upon the periodically captured vision signal inputs. The controller is operative to control the robotic device to manipulate the focus object based upon the focus loop control routine.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
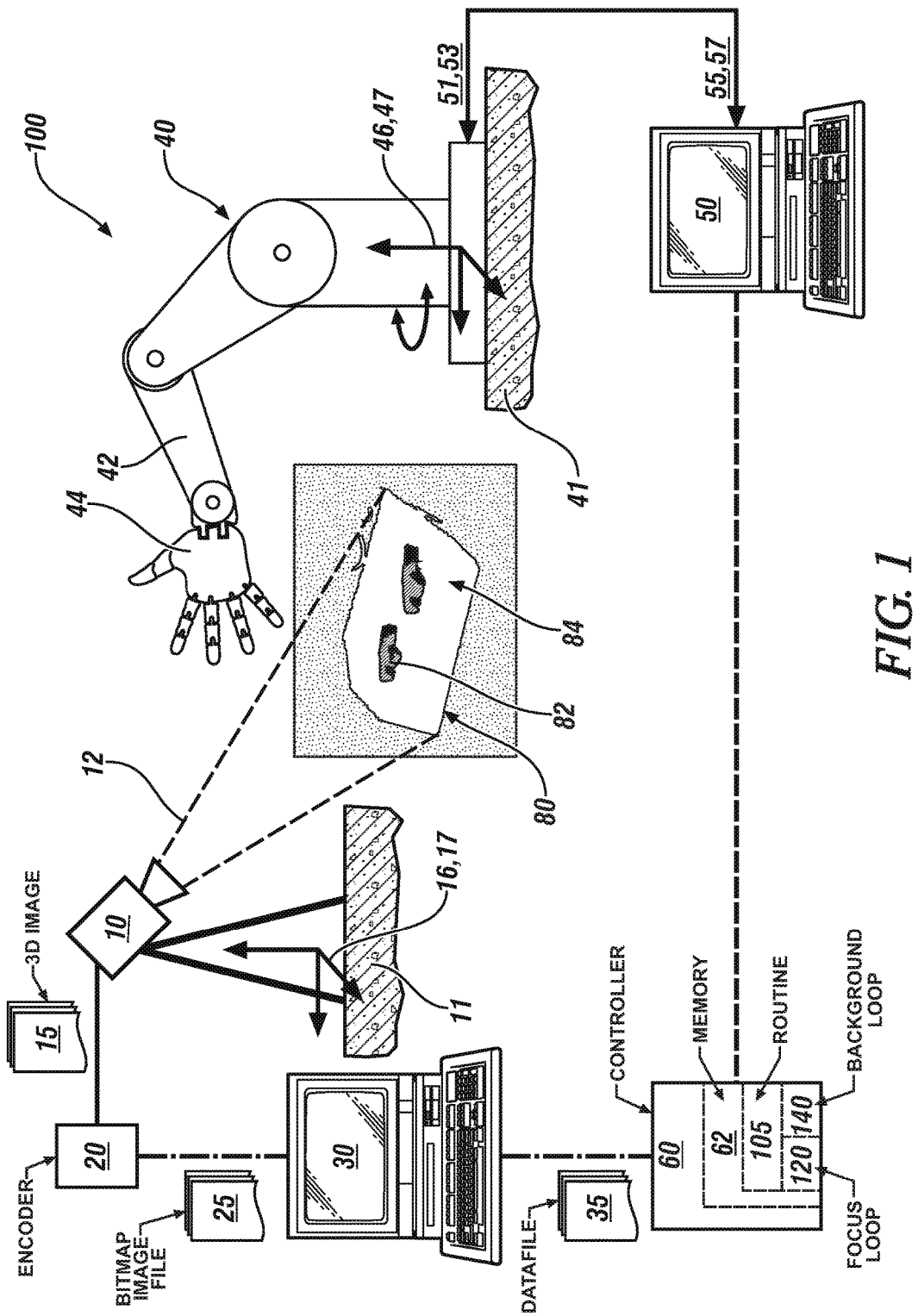
FIG. 1 schematically illustrates a robotic device including a robotic device having an articulable end effector and machine vision system including a remote image detector and an accompanying plurality of controllers, in accordance with the disclosure.

Referring now to the drawings, wherein the depictions are for the purpose of illustrating certain exemplary embodiments only and not for the purpose of limiting the same, FIG. 1 schematically illustrates a vision-perception robotic system 100 that includes a robotic device 40 including a controllable multi-link arm 42 having an articulable end effector 44 and a machine vision system including a remote image detector (camera) 10, a camera controller 30, a robot controller 50, and a system controller 60 for monitoring and control thereof. By way of definition, a robot is any controllable mechanical device that is capable of autonomously executing tasks in response to commands from a controller, including self-monitoring and monitoring an environment in which the robot operates. Monitoring can include any form of sensory monitoring without limitation, e.g., spatial, electrical, magnetic, and the like.

The camera 10 is preferably a stereo device capable of capturing a three-dimensional (3D) image 15, and communicates with an encoder 20 that communicates with the camera controller 30. The camera 10 is capable of capturing, processing and storing an image of a field of view (FOV) 12 that includes a workspace 80 in which the articulable end effector 44 operates. The camera 10 fixedly mounts on a stand resting on a first ground surface 11, which is described in context of a first frame of reference 16 in the form of a first xyz-coordinate system having a first point of origin 17 associated with the camera 10, with the x- and y-coordinates defined by the first ground surface 11 and the z-coordinate orthogonal to the first ground surface 11. The camera 10 can be at any position and orientation relative to the workspace 80 and the FOV 12. The camera 10 is preferably remote from the robotic device 40 in that a movement of the robotic device 40 will not effect a corresponding movement of the camera 10.

The encoder 20 generates a bitmap image file 25, which is a digital representation of the 3D image 15 that includes an original image of the FOV 12 captured at the original resolution of the camera 10. The 3D image 15 of the FOV 12 captured by the camera 10 contains sufficient information for the camera controller 30 to analyze the FOV 12. In one embodiment, the 3D image 15 captured by the camera 10 is a bitmap image file in the form of a 24-bit stereo image including RGB (red-green-blue) visible light spectrum values and depth values that represent the FOV 12. Other embodiments of the 3D image 15 can include a 3D image depicting a black-and-white or a grayscale visible light spectrum representation of the FOV 12, an infrared spectrum representation of the FOV 12, or other image representations without limitation. The camera 10 includes an image acquisition sensor that communicates with the encoder 20 that executes digital signal processing (DSP) on the 3D image 15. The image acquisition sensor of the camera 10 preferably captures the 3D image 15 at a nominally standard-definition resolution, e.g., 640×480 pixels. Alternatively, the image acquisition sensor of the camera 10 may capture the 3D image 15 at a nominally high-definition resolution, e.g., 1440×1024 pixels, or at another suitable resolution. The image acquisition sensor of the camera 10 may capture the 3D image 15 in the form of one or more still images, or alternatively, in the form of a digital video. In any event, the encoder 20 converts the 3D image 15 to the bitmap image file 25 for storage and analysis. The bitmap image file 25 is communicated to the camera controller 30 as an encoded datafile that is stored in a non-transitory digital data storage medium in one embodiment.

The camera controller 30 may be integrated with the camera 10 or remotely located therefrom. The camera controller 30 periodically captures and communicates the bitmap image file 25 of the FOV 12 to the system controller 60. The workspace 80 captured in the FOV 12 represented by the bitmap image file 25 may include a focus object 82 and a background 84, which may include other objects that are similar to but not presently associated with the focus object 82. As used herein, the term "object" and related terms such as "focus object" refer to physically discernible discrete entities, including those that are manipulable by the end effector 44. In one embodiment, one or more of the objects may be recognizable to the system controller 60 based upon a comparison with pre-captured bitmap image files of the object, also referred to herein as a "known object". Preferably, the focus 82 is a known object. The camera controller 30 generates a point cloud datafile 35, which includes point cloud data that is extracted from the bitmap image file 25 of the FOV 12 that includes only the workspace 80, i.e., the focus object 82 and the background 84.

The robotic device 40 preferably rests on a second ground surface 41, which is described in context of a second frame of reference 46 in the form of a second xyz-coordinate system having a second point of origin 47 associated with the robotic device 40, with the x and y coordinates defined by the second ground surface 41 and the z coordinate orthogonal to the second ground surface 41. The end effector 44 attaches to the end of the multi-link 42 as its hand, tool, manipulator, etc. It is articulated, i.e., is capable of moving its joints and changing its shape. The multi-link arm 42 and the end effector 44 are configured to controllably selectively pivot, extend and rotate in response to arm commands 51 and end effector commands 53, respectively, which are generated by a robot controller 50. Arm commands 51 control movement of the multi-link arm 42 and end effector commands 53 control movement of the articulable end effector 44. Movements of the multi-link arm 42 and the articulable end effector 44 are described in context of the second xyz-coordinate system 46, with the x- and y-coordinates defined by the second ground surface 41 and the z-coordinate orthogonal to the second ground surface 41. Preferably the multi-link arm 42 and the articulable end effector 44 are equipped with position sensing devices in the form of angle measurement devices at each articulation joint or other suitable position sensing devices and methods to determine rotation(s) thereat. Measured arm positions 55 represent measured positions of the multi-link arm 42 including the angles associated with the articulation joints of the multi-link arm 42 and measured poses 57 represent measured angles associated with the articulable end effector 44. The measured arm positions 55 are preferably described in context of the second frame of reference 46. Other details related to multi-link arms 42 and articulable end effectors 44 and commands for controlling them are known and are not described in detail herein.

The system controller 60 operatively couples to the robotic device 40 and communicates with the camera 10. The system controller 60 includes or communicates with a non-transitory memory component 62 that includes machine-readable instructions in the form of a vision perception routine 105 including a focus loop 120 that dynamically tracks the focus object 82 in the workspace 80 and a background loop 140 that monitors the background 84 of the workspace 80. The system controller 60 preferably executes both the vision perception routine 105 including the focus loop 120 and the background loop 140.

The camera controller 30, robot controller 50, and system controller 60 may be separate and distinct devices, or may instead be any other suitable combination of controller systems. Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, control routines, code, algorithms and similar terms mean any controller-executable instruction sets including calibrations and look-up tables. Communications between controllers and communications between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like.

Figure 2:
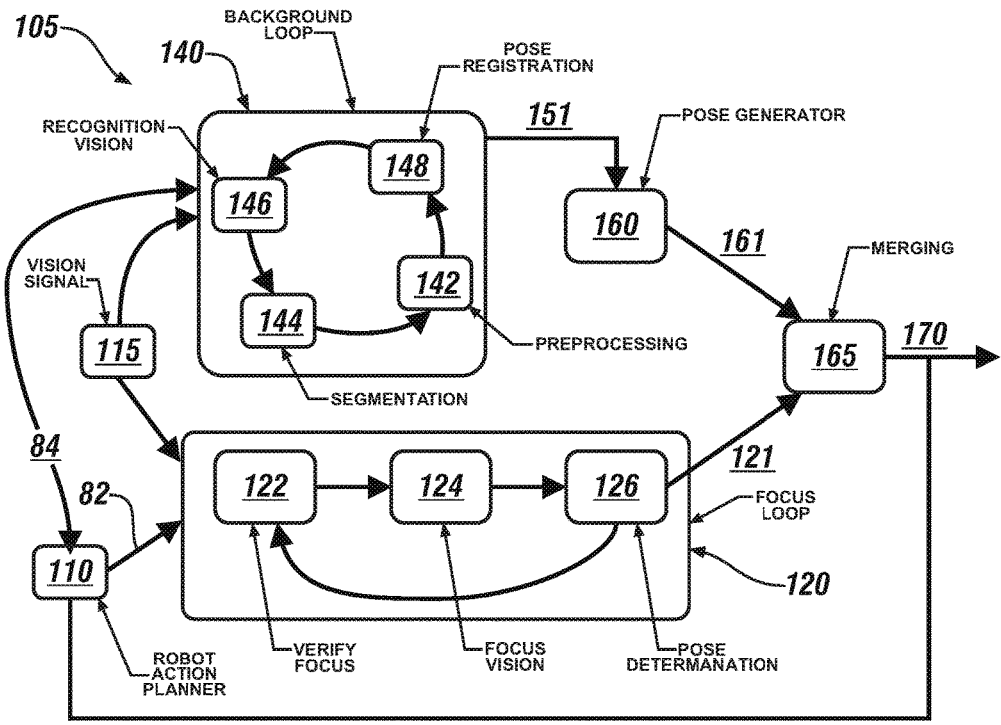
FIG. 2 schematically shows an embodiment of the vision perception routine that includes a robot action planner, a vision signal input, a focus loop control routine, a background loop control routine and a merging element, in accordance with the disclosure.

FIG. 2 schematically shows an embodiment of the vision perception routine 105 that is employed by a controller of a vision-perception robotic system 100 to generate a combined resultant 170 based upon a FOV including a workspace that is employed by a robot controller to effect action by the robotic device in response thereto. One embodiment of the vision-perception robotic system 100, FOV 12 and workspace 80 is shown with reference to FIG. 1. The vision perception routine 105 includes a robot action planner 110, a vision signal input 115, a focus loop control routine (focus loop) 120, a background loop control routine (background loop) 140 and a merging element 165. The focus loop 120 generates a focus object pose 121 that relates to focus object 82 of the FOV 12 and the background loop 140 generates environmental information 151 that is periodically updated to provide an all-object pose 161 that relates to the background 84 in the FOV 12. The focus object pose 121 and the all-object pose 161 are supplied to the merging element 165 to generate a combined pose 170 that relates to the entire workspace 80 in the FOV 12. The vision perception routine 105 is periodically executed as a scheduled task, with the focus loop 120 executing simultaneously asynchronously in parallel with the background loop 140. The focus loop 120 may execute simultaneously asynchronously in parallel with the background loop 140 by employing multiple controllers to execute the focus loop 120 and the background loop 140 at the same time, or employing a single controller and employing task switching or multi-tasking, wherein the focus loop 120 executes to a certain point, at which time the controller stops executing the focus loop 120 and executes a portion of the background loop 140 to a certain point, with this process repeated iteratively. When the cycle times associated with the executed portions are small, it may appear that both the focus loop 120 and the background loop 140 are running in parallel. This preferably includes the focus loop 120 executing at a faster processing rate than the background loop 140. By way of example, the focus loop 120 may execute at a 100 microsecond loop cycle whereas the background loop 140 may execute at a 1.0 millisecond loop cycle. The vision perception routine 105 allows computing resources to be distributed between two parallel-executing asynchronous co-processing loops, i.e., the focus loop 120 and the background loop 140, based on a commanded or perceived attention of the robotic device 40. The focus loop 120 executes in real time to track a focus object 82 while the background loop 140 updates the environmental information 151 using remaining computing resources. By way of definition, the environmental information 151 includes any information in the FOV 12 that is not the focus object 82.

The robot action planner 110 includes a control routine that evaluates the vision signal input 115 and decides upon a course of action to be performed by the robotic device 40 based on location of objects presently in the FOV 12 and the location of the robotic device 40. The vision signal input 115 preferably includes the point cloud datafile 35 representing the FOV 12 and workspace 80 described with reference to FIG. 1. The vision perception routine 105 initially executes the background loop 140 to generate the all-object pose 161 without executing the focus loop 120 to coarsely identify location and objects in the FOV 12 by monitoring the vision signal input 115. The robot action planner 110 selects one of the objects identified in the vision signal input 115 as the focus object 82 for the robotic device 40, wherein the focus object 82 is described with reference to FIG. 1. In one embodiment, the focus object 82 is a known object that is proximal to the end effector 44 of the robotic device 40 in the FOV 12 that the robotic device 40 can pick up. Alternatively, the focus object 82 is a moving target that interacts with the end effector 44. Furthermore, the focus object 82 can change dynamically based on input from the robot action planner 110.

The vision perception routine 105 initiates executing the focus loop 120 and tracks the focus object 82 in successively received vision signal inputs 115 when the focus object 82 has been selected in the FOV 12, thus providing real-time perception of the focus object 82 for manipulation by the robotic device 40. The focus loop 120 executes in a different computational thread and has a higher execution priority than the background loop 140.

The focus loop 120 includes checking or otherwise verifying priority of the focus object 82, which includes verifying that the robotic device 40 remains focused on the focus object 82 based upon proximity and other factors (Step 122). Upon verification of priority of the focus object 82, the vision signal input 115 is subject to a focused vision procedure (Step 124) and a pose determination procedure (Step 126) to extract and otherwise determine a location of the focus object 82 in the FOV 12. This process is iteratively executed and updated until there is a sufficient and/or statistically significant recognition and location of the focus object 82 in the FOV, designated as a focus object pose 121. The focus object pose 121 provides a recognition and location of the focus object 82 that is communicated to the merging element 165.

The background loop 140 evaluates the vision signal input 115 to recognize objects in the FOV 12 other than the focus object 82, and gradually generates the environmental information 151 through successive iterations. The background loop 140 executes in a different thread and has a lower priority than the focus loop 120, but is capable of detecting changes in the workspace 80, such as addition of new objects, removal of an object or a change in position of an object. The background loop 140 therefore only uses remaining resources in the form of remaining processor execution time, bandwidth and slower execution and update rates when the focus object loop 120 is executing. The processes to recognize object type and pose are carried out by self-managed vision task agents, shown as primary vision task agents 142, 144, 146, 148 that cyclically and sequentially execute as described with reference to FIG. 3. The primary vision task agents 142, 144, 146, 148 execute dynamically based on different situations as described herein. The primary vision task agents 142, 144, 146, 148 are employed to provide the environmental information 151 that is employed by the pose generator 160 to generate and update the all-object pose 161. The all-object pose 161 includes all of the coarsely identified objects in the FOV and the background information. Objects that have similar pose and same type can be combined into one object.

The merging element 165 is a controller or other suitable device that combines the focus object pose 121 with the all-object pose 161, and publishes the combined resultant 170 to effect action by the robotic device 40 in response thereto. The focus object pose 121 describes the focus object 82, and the all-object pose 161 describes the background 84, and the combined resultant 170 describes the entire workspace 80.

Figure 3:
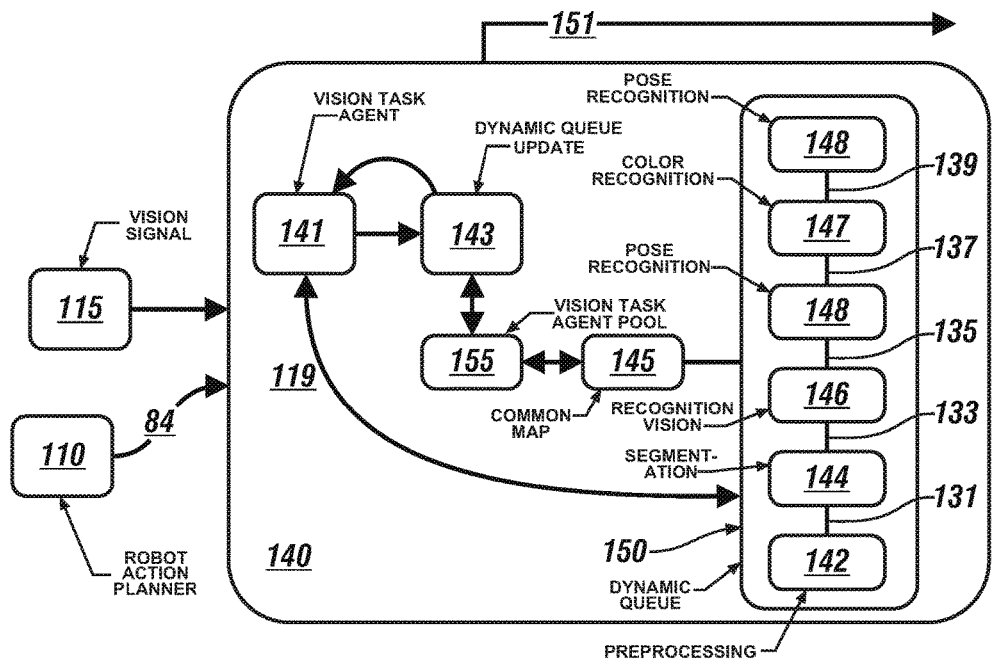
FIG. 3 schematically shows operation of a background loop for the vision perception routine described with reference to FIG. 2, including an iterative process for sequentially executing vision task agents to evaluate the background to generate environmental information, in accordance with the disclosure.

FIG. 3 schematically shows operation of the background loop 140 in response to the vision signal input 115 and the identified focus object 82, if any. The background loop 140 is an iterative process for sequentially executing vision task agents to evaluate the background 84 to generate the environmental information 151 that is employed by the pose generator 160 to generate and update the all-object pose 161. The background loop 140 includes a vision task agent execution step 141 and a dynamic queue updating step 143. The vision task agent execution step 141 sequentially executes successive vision task agents provided from the dynamic queue 150, and the dynamic queue updating step 143 identifies and selects vision task agents from a vision task agent pool 155 based upon results from the most recently executed vision task agent and enters them into the dynamic queue 150 for execution.

The vision task agent pool 155 includes the primary vision task agents, including, by way of example, a preprocessing vision task agent 142, a segmentation vision task agent 144, a recognition vision task agent 146 and a pose registration vision task agent 148 in one embodiment, and one or more secondary vision task agents, e.g., a color recognition agent 147, etc. Each of the vision task agents is a controller-executed routine containing its own vision library or vision algorithm that evaluates and analyzes data in the vision signal input 115 to achieve a result, as described herein. The primary vision task agents 142, 144, 146, 148 have a preferred order of execution that may be dynamically changed by the dynamic queue updating process 143 responsive to dynamically occurring situations. The primary vision task agents 142, 144, 146, 148 share a common map 145 that contains information of the current scene that is based upon information about the FOV 12 from the regularly acquired vision signal inputs 115.

When one of the vision task agents is selected to execute, it first examines the common map 145 and decides how it should execute. Previous information may be reused if the scene is substantially unchanged. After the selected vision task agent completes its processing, it updates the common map to the new result. Based on the current and previous results, the vision task agent decides which other of the vision task agents executes next. Thus the presently executing vision task agent may select the next primary vision task agent in the dynamic queue 150 for execution. Alternatively, the vision task agent may select another vision task agent, e.g., a secondary vision task agent to execute to achieve more clarity to the vision signal to permit further processing.

Preferably, the primary vision task agents are initially queued in the dynamic queue 150 to execute in the following order: preprocessing vision task agent 142, followed by the segmentation vision task agent 144, followed by the recognition vision task agent 146, followed by the pose registration vision task agent 148. This is shown schematically by steps 131, 133 and 135, respectively. Furthermore, each of the primary vision task agents may dynamically add other primary or secondary vision task agents. By way of example, the pose registration vision task agent 148 can dynamically add a color recognition agent 147 that can be followed by a reiteration of the pose registration vision task agent 148 during the next execution. This is shown schematically by steps 137 and 139, respectively.

The vision task agents 142, 144, 146, 148 allocate themselves onto the dynamic queue 150. The dynamic queue 150 determines which one of the vision task agents 142, 144, 146, 148 is to execute next, and supplies such information to the vision task agent execution step 141 via communications line 119. Meanwhile the currently executing one of the vision task agents 142, 144, 146, 148 may add one or more new vision task agents onto the dynamic queue 150 as they determine the need for more information. The dynamic queue 150 selects the order of execution of the vision task agents based upon context and previous results to increase recognition and pose accuracy.

The preprocessing vision task agent 142 executes preprocessing on either the vision signal input 115 or a subset thereof. By way of example, one preprocessing vision task agent can include executing a median filter or mean filter on either a 3D point cloud or a 2D image of the vision signal input 115. This type of vision task agent chooses the next vision task agent to execute based on the result after the preprocessing. For example, if the 3D point cloud of the whole scene is complete and dense enough after processing the median filter, the vision task agent can decide to process to the next step and execute segmentation on the whole scene point cloud. If the result is not satisfying, the vision task agent could decide to execute other preprocessing agents until the result has sufficient clarity to permit further processing.

The segmentation vision task agent 144 executes segmentation on the vision signal input 115 including the whole scene 3D point cloud or 2D image. Segmentation includes clustering points in a 3D point cloud into different separate objects or segmenting parts in an image using 2D edges. This type of vision task agent chooses the next agent to execute based on the segmented result and pass results. For example, if one of the segmented objects in the current scene was in fact two objects in the last result, the vision task agent may decide to execute another segmentation vision task agent to double check the result or execute another preprocessing vision task agent.

The recognition vision task agent 146 recognizes individual object types. It may use 3D or color information to classify objects including, by way of example, a Viewpoint Feature Histogram (VFH), Ensemble of Shape Functions (ESF), Scale Invariant Feature Transform (SIFT), and Color Histogram agents are all examples of recognition vision task agent. A recognition vision task agent generates all the probability of an object being every known type. The recognition agent then decides if it gained enough confidence to recognize one of the known objects. If the highest probability for an object being a type is low, the recognition vision task agent may decide to execute other recognition vision task agents to gain more confidence about the classification result, or it may decide to re-execute the segmentation vision task agent for a better segmentation. The recognized object types are shown in labels above the objects. There can be multiple recognition agents, for example, one using color histogram and one using SIFT feature. If the vision task agent that uses color histogram has a high confidence of what the object is, it can go to the pose estimation step directly. Otherwise it might decide that more recognition agents need to be executed to increase the confidence.

The pose registration vision task agent 148 identifies the pose of a known object. For example, an agent implementing an iterative closest point algorithm (ICP) uses the 3D point cloud of the input and a known model to find the most likely pose. It could also use information from previous results to speed up the process, such as making a previously recognized pose as an initial guess. The pose registration vision task agent decides which vision task agent to execute next based on the result. For example, the ICP agent generates a matching score; if the matching score is low, the object might be recognized as a wrong type, and therefore it may execute a recognition agent.

By having self-managed vision task agents, the system is easily extendable. A new algorithm can be added to the self-managed vision task agent pool and coordinate with other old algorithms without breaking the processing structure. The way the system is set up also makes the process more robust, as the system is able to generate results even if certain environmental conditions disables one of the vision task agents.

The vision perception routine 105 includes a vision system that coordinates execution of several different vision routines that change based on a change in the robotic arm's attention to recognize and track objects in a workspace. This improves the manner in which a user can interact with a robotic device 40 and significantly increases the variety of tasks a robotic device 40 can execute. By distributing resources and scheduling different vision task agents to recognize multiple objects and track poses in real time, computing resources are distributed efficiently. This provides a vision system that coordinates different vision algorithms and distributes computing resources based on a robotic arm's attention, including a focus loop that has access to sensors and tracks an object in real time, a background loop that has access to sensors and the ability to recognize objects in the whole robotic arm workspace, a mechanism to use robot attention to distribute computing resources between a focus loop and a background loop, and a mechanism to control focus of the vision system based on the robot attention.

The machine vision system for the robotic device thus includes dynamic vision task agent queueing based on context and previous results to increase recognition and pose accuracy and efficiency, with a faster higher-priority focus loop for real-time perception of a focus object under manipulation. The background loop detects workspace changes, e.g., presence of new objects, removed objects, moved objects, etc., with awareness of available computational resources. This machine vision system tracks unpredictable changes employed in a manufacturing environment and may be integrated into execution of a variety of manufacturing tasks to recognize multiple objects and track a pose of a focus object in real time. The system distributes resources efficiently and change vision algorithms based on different situations. This system would allow robots to react quickly to unexpected changes and perform more flexible tasks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A machine vision system for a controllable robotic device proximal to a workspace, comprising:
   an image acquisition sensor in communication with a controller;
   the image acquisition sensor arranged to periodically capture vision signal inputs each including an image of a field of view including the workspace;
   the controller operatively coupled to the robotic device and including a non-transitory memory component including an executable vision perception routine;
   the vision perception routine including a focus loop control routine operative to dynamically track a focus object in the workspace and a background loop control routine operative to monitor a background of the workspace, wherein the focus loop control routine executes simultaneously asynchronously in parallel with the background loop control routine to determine a combined resultant including the focus object and the background based upon the periodically captured vision signal inputs; and
   the controller disposed to execute the vision perception routine and operative to control the robotic device to manipulate the focus object in response to the execution thereof.

2. The machine vision system of claim 1, wherein the focus loop control routine operative to dynamically track a focus object in the workspace comprises the focus loop control routine operative to:
   verify a priority of the focus object; and
   iteratively execute a focused vision procedure and a pose determination procedure to determine a location of the focus object in the field of view.

3. The machine vision system of claim 1, wherein the background loop control operative to monitor a background of the workspace comprises the focus loop control routine operative to:
   sequentially execute vision task agents provided from a dynamic queue to evaluate the background to generate environmental information; and
   update the dynamic queue to identify and select a vision task agents from a vision task agent pool based upon results from a presently executing one of the vision task agents.

4. The machine vision system of claim 3, wherein the vision task agent pool includes a plurality of primary vision task agents and secondary vision task agents.

5. The machine vision system of claim 4, wherein the primary vision task agents and the secondary vision agents share a common map containing information about the field of view from the periodically captured vision signal inputs.

6. The machine vision system of claim 4, wherein the primary vision task agents include a preprocessing vision task agent, a segmentation vision task agent, a recognition vision task agent and a pose registration vision task agent.

7. The machine vision system of claim 6, wherein the primary vision task agents include the preprocessing vision task agent, the segmentation vision task agent, the recognition vision task agent and the pose registration vision task agent have a preferred order of execution.

8. The machine vision system of claim 7, wherein the preferred order of execution of the primary vision task agents dynamically changes responsive to dynamically occurring situations in the field of view.

9. The machine vision system of claim 6, wherein the preprocessing vision task agent includes executing a filter on the periodically captured vision signal inputs.

10. The machine vision system of claim 6, wherein the segmentation vision task agent executes segmentation including clustering points in the periodically captured vision signal inputs into different separate objects.

11. The machine vision system of claim 6, wherein the recognition vision task agent recognizes individual object types from the periodically captured images of the field of view.

12. The machine vision system of claim 11, wherein the recognition vision task agent includes one of a viewpoint feature histogram, an ensemble of shape functions, a scale invariant feature transform and a color histogram agent.

13. The machine vision system of claim 6, wherein the pose registration vision task agent identifies a pose of the focus object identified in the periodically captured vision signal inputs.

14. The machine vision system of claim 4, wherein the secondary vision task agents include a color recognition agent.

15. A machine vision system for a controllable robotic device proximal to a workspace, comprising:
   an image acquisition sensor in communication with a controller;
   the image acquisition sensor arranged to periodically capture vision signal inputs each including a bitmap image file of a field of view including the workspace, the workspace including a focus object in the form of a known object;

the controller operatively coupled to the robotic device and including a non-transitory memory component including an executable vision perception routine;

the vision perception routine including a focus loop control routine operative to dynamically track the focus object in the workspace and a background loop control routine operative to monitor a background of the workspace, wherein the focus loop control routine executes simultaneously asynchronously in parallel with the background loop control routine to determine a combined resultant including the focus object and the background based upon the periodically captured vision signal inputs; and the controller disposed to execute the vision perception routine and operative to control the robotic device to manipulate the focus object in response to the execution thereof.

16. The machine vision system of claim 15, wherein the focus loop control routine operative to dynamically track a focus object in the workspace comprises the focus loop control routine operative to:

verify a priority of the focus object; and iteratively execute a focused vision procedure and a pose determination procedure to determine a location of the focus object in the field of view.

17. The machine vision system of claim 15, wherein the background loop control operative to monitor a background of the workspace comprises the background loop control operative to:

sequentially execute vision task agents provided from a dynamic queue to evaluate the background to generate environmental information; and update the dynamic queue to identify and select a vision task agent from a vision task agent pool based upon results from a presently executing one of the vision task agents.

* * * * *